United States Patent
Giannakopoulos (10) Patent No.: US 8,111,717 B2
(45) Date of Patent: *Feb. 7, 2012

(54) FLEXIBLE TRIBUTARY INTERFACE

(75) Inventor: Dimitrios Giannakopoulos, Methuen, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/507,277

(22) Filed: Jul. 22, 2009

(65) Prior Publication Data

US 2009/0279570 A1    Nov. 12, 2009

Related U.S. Application Data

(63) Continuation of application No. 11/368,573, filed on Mar. 6, 2006, now Pat. No. 7,583,709.

(51) Int. Cl.
*H04J 3/00* (2006.01)
(52) U.S. Cl. .......... 370/476; 370/539
(58) Field of Classification Search .......... 370/464, 370/466, 468, 476, 498, 503, 505, 539
See application file for complete search history.

(56) References Cited

U.S. PATENT DOCUMENTS

| 5,940,456 A * | 8/1999 | Chen et al. ............ 370/516 |
| 6,603,776 B1 * | 8/2003 | Fedders et al. ............ 370/476 |
| 7,583,709 B2 * | 9/2009 | Giannakopoulos ............ 370/537 |
| 2003/0156012 A1 * | 8/2003 | Omidi et al. ............ 370/229 |

* cited by examiner

*Primary Examiner* — Ricky Ngo
*Assistant Examiner* — Phuongchau B Nguyen
(74) *Attorney, Agent, or Firm* — Law Office of Gerald Maliszewski; Gerald Maliszewski (57) ABSTRACT

A system and method are provided for transporting Plesiochronous Digital Hierarchy (PDH) tributaries. The method accepts a plurality of PDH tributaries; generates a serial data stream of interleaved PDH tributaries; generates a serial control stream of signals for recovering the PDH tributaries; and, generates a clock signal for timing the data and control streams. The serial data stream of interleaved PDH tributaries is loaded into the payload of a data frame structure. Likewise, the serial control stream is loaded into the payload of a control frame structure. The data bytes of the serial data stream and the control bytes of the serial control stream are both transmitted at the same data rate. That is, there is a control byte generated for each data byte. Thus, the control bytes in the control frame structure are aligned with corresponding data bytes in the data frame structure.

2 Claims, 9 Drawing Sheets

| POH | BIP | FEBE | RFI | SIGNAL LABEL | | | FERF |
|---|---|---|---|---|---|---|---|
| R | R | R | R | R | R | R | R |
| colspan: 32 BYTES OF INFORMATION/DATA (I) | | | | | | | |
| R | R | R | R | R | R | R | R |
| R | R | R | R | R | R | R | R |
| C1 | C2 | O | O | O | O | R | R |
| colspan: 32 BYTES OF INFORMATION/DATA (I) | | | | | | | |
| R | R | R | R | R | R | R | R |
| R | R | R | R | R | R | R | R |
| C1 | C2 | O | O | O | O | R | R |
| colspan: 32 BYTES OF INFORMATION/DATA (I) | | | | | | | |
| R | R | R | R | R | R | R | R |
| R | R | R | R | R | R | R | R |
| C1 | C2 | R | R | R | R | R | S1 |
| S2 | I | I | I | I | I | I | I |
| colspan: 31 BYTES OF INFORMATION/DATA (I) | | | | | | | |
| R | R | R | R | R | R | R | R |

Fig. 4
*(PRIOR ART)*

DS1 MAPPING (IN VT1.5 SPE)

| FRAME# | BYTE# | | |
|---|---|---|---|
| FRAME#1 | 1 | R | |
| | 2 | r r r r r I r | |
| | 3-26 | 24 X I | |
| FRAME#2 | 1 | R | |
| | 2 | c1 c2 o o o o I r | |
| | 3-26 | 24 X I | |
| FRAME#3 | 1 | R | |
| | 2 | c1 c2 o o o o I r | |
| | 3-26 | 24 X I | |
| FRAME#4 | 1 | R | |
| | 2 | c1 c2 r r r s1 s2 r | |
| | 3-26 | 24 X I | | c1-c2: STUFF CONTROL
s1-s2: STUFF OPPORTUNITY
o: OVERHEAD
r: FIXED STUFF

| ROW/COLUMN | 1-3 | 4 | 5 | 6 | 7-32 | 33 | 34 | 35-61 | 62 | 63 | 64-90 |
|---|---|---|---|---|---|---|---|---|---|---|---|
| 1 | A1-A2~J0 | R | $I_1$ | $I_2$ | $I_3$-$I_{28}$ | R | $I_1$ | $I_2$-$I_{28}$ | R | $I_1$ | $I_2$-$I_{28}$ |
| 2 | R | R | $I_1$ | $I_2$ | $I_3$-$I_{28}$ | R | $I_1$ | $I_2$-$I_{28}$ | R | $I_1$ | $I_2$-$I_{28}$ |
| 3 | R | R | $I_1$ | $I_2$ | $I_3$-$I_{28}$ | R | $I_1$ | $I_2$-$I_{28}$ | R | $I_1$ | $I_2$-$I_{28}$ |
| 4 | R | R | $I_1$ | $I_2$ | $I_3$-$I_{28}$ | R | $I_1$ | $I_2$-$I_{28}$ | R | $I_1$ | $I_2$-$I_{28}$ |
| 5 | R | R | $I_1$ | $I_2$ | $I_3$-$I_{28}$ | R | $I_1$ | $I_2$-$I_{28}$ | R | $I_1$ | $I_2$-$I_{28}$ |
| 6 | R | R | $I_1$ | $I_2$ | $I_3$-$I_{28}$ | R | $I_1$ | $I_2$-$I_{28}$ | R | $I_1$ | $I_2$-$I_{28}$ |
| 7 | R | R | $I_1$ | $I_2$ | $I_3$-$I_{28}$ | R | $I_1$ | $I_2$-$I_{28}$ | R | $I_1$ | $I_2$-$I_{28}$ |
| 8 | R | R | $I_1$ | $I_2$ | $I_3$-$I_{28}$ | R | $I_1$ | $I_2$-$I_{28}$ | R | $I_1$ | $I_2$-$I_{28}$ |
| 9 | R | R | $I_1$ | $I_2$ | $I_3$-$I_{28}$ | R | $I_1$ | $I_2$-$I_{28}$ | R | $I_1$ | $I_2$-$I_{28}$ |

R: RESERVED BYTE
I: INFORMATION (DATA) BYTE, WHICH INCLUDES DS1/E1 PAYLOAD AS WELL AS OVERHEAD.
$I_1$ BELONGS TO DS1 #1, $I_2$ TO DS #2, ETC.
FOR THE E1 CASE, THERE ARE 4 BYTES PER E1 PER ROW, SINCE THERE ARE 21 E1 TRIBUTARIES IN TOTAL

Fig. 9

| ROW/COLUMN | 1-3 | 4 | 5 | 6 | 7-32 | 33 | 34 | 35-61 | 62 | 63 | 64-90 |
|---|---|---|---|---|---|---|---|---|---|---|---|
| 1 | A1-A2-J0 | R | C1 | C2 | C3-C28 | R | C1 | C2-C28 | R | C1 | C2-C28 |
| 2 | R | R | C1 | C2 | C3-C28 | R | C1 | C2-C28 | R | C1 | C2-C28 |
| 3 | R | R | C1 | C2 | C3-C28 | R | C1 | C2-C28 | R | C1 | C2-C28 |
| 4 | R | R | C1 | C2 | C3-C28 | R | C1 | C2-C28 | R | C1 | C2-C28 |
| 5 | R | R | C1 | C2 | C3-C28 | R | C1 | C2-C28 | R | C1 | C2-C28 |
| 6 | R | R | C1 | C2 | C3-C28 | R | C1 | C2-C28 | R | C1 | C2-C28 |
| 7 | R | R | C1 | C2 | C3-C28 | R | C1 | C2-C28 | R | C1 | C2-C28 |
| 8 | R | R | C1 | C2 | C3-C28 | R | C1 | C2-C28 | R | C1 | C2-C28 |
| 9 | R | R | C1 | C2 | C3-C28 | R | C1 | C2-C28 | R | C1 | C2-C28 |

R: RESERVED BYTE
C: CONTROL BYTE, WHICH INCLUDES INFORMATION FOR MARKING PAYLOAD AND OVERHEAD.

THE C BYTES (INFORMATION AREA) MAP ONE-TO-ONE TO THE ALIGNED DATA BYTES, TIME DIVISION MULTIPLEXED.
$C_1$ BELONGS TO DS1 #1, $C_2$ TO DS #2, ETC.
FOR THE E1 CASE, THERE ARE 4 BYTES PER E1 PER ROW, SINCE THERE ARE 21 E1 TRIBUTARIES IN TOTAL

FLEXIBLE TRIBUTARY INTERFACE

RELATED APPLICATIONS

This application is a Continuation of a application entitled, FLEXIBLE TRIBUTARY INTERFACE WITH SERIAL CONTROL LINE, invented by Dimitrios Giannakopoulos, Serial No, 11/368,573, filed Mar. 6, 2006, now U.S. Pat. No. 7,583,709, which is incorporated herein by reference.

BACKGROUND OF THE INVENTION

1. Field of the Invention

This invention generally relates to digital communications and, more particularly, to a system and method for synchronously transporting Plesiochronous Digital Hierarchy tributaries.

2. Description of the Related Art

Plesiochronous Digital Hierarchy (PDH) was developed by ITU-T G.702 to increase transmission bandwidth by multiplexing primary 2.048 megabyte per second (Mb/s) trunks. The multiplexed trunks are synchronized by adding (stuffing) bits at each level of multiplexing. Bit stuffing is necessary because of timing asynchronicity. The added bits permit multiple trunks to be synchronized without delays, even if one of the trunks is late in delivering data. If one trunk is late in delivering data, the multiplexer substitutes a stuff bit for the late-arriving data bit, and moves on to the following trunk. A 2.048 Mb/s trunk is called E1, and the hierarchy is based on multiples of 4 E1s, as follows:

E2: 4×E1–8 Mb/s;
E3: 4×E2–34 Mb/s;
E4: 4×E3–140 Mb/s; and,
E5: 4×E4–565 Mb/s.

DS1 is a 1.544 Mb/s trunk, which can also be arranged in a hierarchical order in multiples (DS2/DS3/DS4/DS5), similar to the E1 hierarchy (E2/E3/E4/E5). To aid in the synchronization of tributaries, extra justification) bits are added. These justification bits are used to communicate with the multiplexers, providing a map of data and spare (stuffed) bits.

Figure 1:
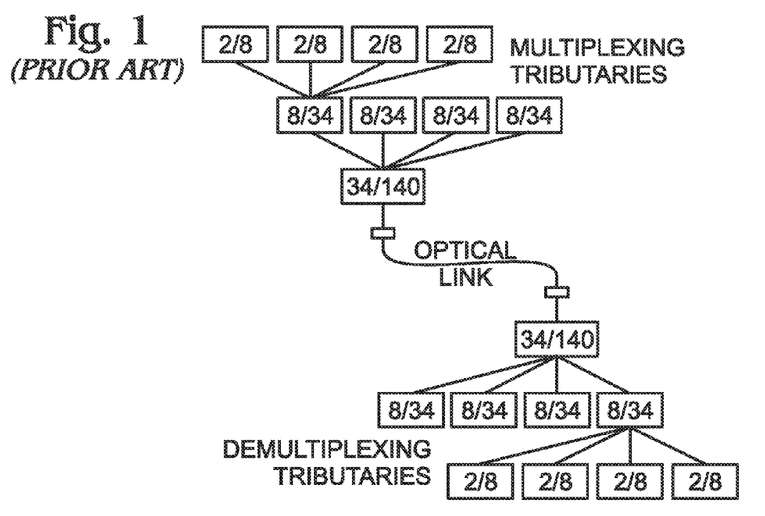
FIG. 1 is a diagram depicting a PDH system for multiplexing and demultiplexing of tributaries (prior art).

FIG. 1 is a diagram depicting a PDH system for multiplexing and demultiplexing of tributaries (prior art). A multiplexer on one level of the hierarchy adds the spare bits needed for synchronization on that level. Likewise, a demultiplexer removes the spare bits added for that hierarchy level. A multiplexer (MUX) on one level operates on a different timing than multiplexers on another level. That is, the timing for a MUX that combines 30×64 Kb/s channels into on 2.048 Mb/s E1 channel, is necessarily different that the timing for a MUX that combines up to 4×2 Mb/s into 8 Mb/s.

The use of stuff bits points to the basic inflexibility associated with PDH communications. In contrast, Synchronous Digital Hierarchy (SDH) and Synchronous Optical Network (SONET), provide for flexible bandwidth on demand capabilities. One advantage of SDH/SONET is that different bandwidth data streams may be interfaced without multiplexing. Like PDH, SDH and SONET may be formed from multiples of E1 (DS1), as follows:

STM-1: 63×E1–155 Mb/s;
STM-4: 4×STM-1–622 Mb/s; and,
STM-16: 4×STM-4–2.5 Gb/s.

PDH may be interfaced with SDH/SONET. To that end, three G transmission series are recommended: G.707—SDH Bit Rates; G.708—The SDH Network Node Interface; and, G.709—Synchronous Multiplexing structure.

Figure 2:
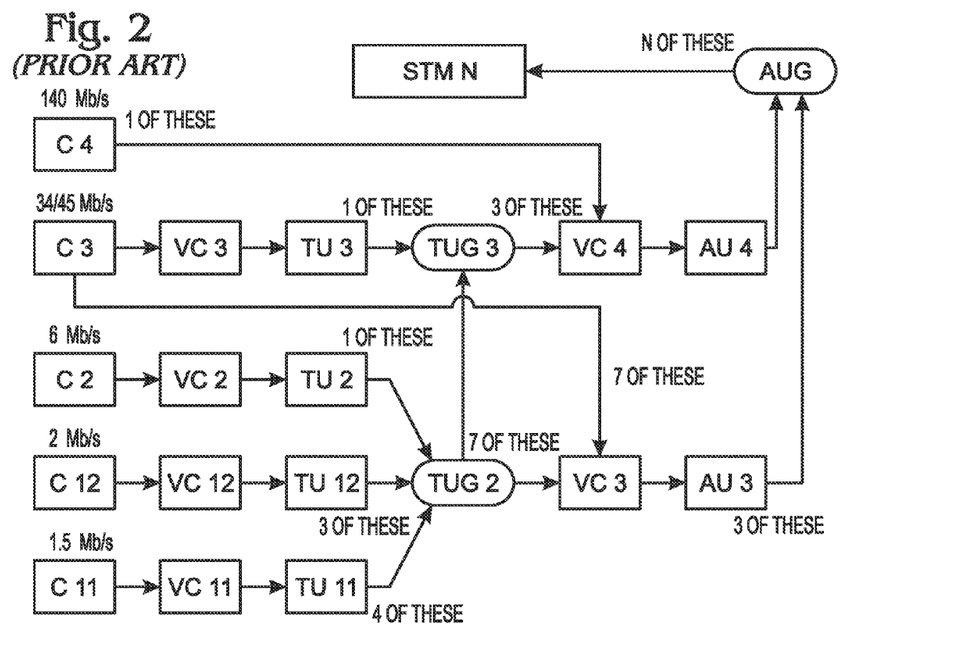
FIG. 2 is a diagram depicting the transport of PDH tributaries in a SDH frame (prior art).

FIG. 2 is a diagram depicting the transport of PDH tributaries in a SDH frame (prior art). Except for the 8 Mb/s tributaries, PDH outputs are initially mapped into Containers (C) and then into fixed size Virtual Containers (VC). When the VC is aligned in the Tributary Unit (TU), a pointer is added to indicate the phase of the VC. TU's are then grouped, via Time Division Multiplexing (TDM), into Tributary Unit Groups (TUG). The TUGs are collated into Administrative Units (AU). The VCs and the pointers are incorporated into the section overhead of the STM frame. One AU-4 forms an STM-1, 4 AU-4s form an STM-4. STM-16 and STM-64 are also possible.

Figure 3:
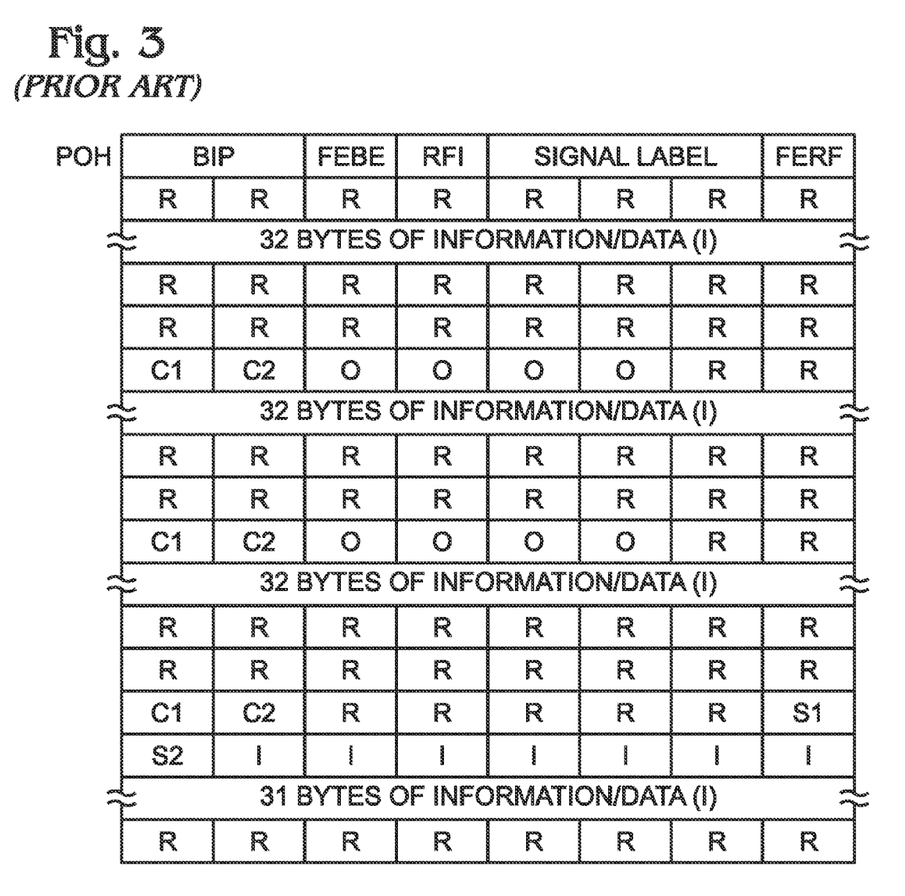
FIG. 3 is a diagram depicting a 2 Mb/s E1 tributary mapped into an SDH TU-12 SPE virtual container (prior art).

FIG. 3 is a diagram depicting a 2 Mb/s E1 tributary mapped into an SDH TU-12 SPE virtual container (prior art). A multiplexer compensates for variations in the speed of the tributary by using stuff bits. Stuff opportunities are identified by S1 and S2, and controlled by the control bits C1 and C2, respectively. A "0" value C bit means that the corresponding S bit is data, and a "1" bit means that the S bit is undefined. O represents overhead channel bits and I represents information bits. The bytes are organized from left to right and top to bottom. The first byte is Path Overhead (POH). The POH uses Bit Interleaved Parity (BIP) to monitor errors. In addition, there are fault indicators, Far End Block Error (FEBE), Remote Fail Indicator (RFI) and Far End Receive Failure (FERF). The Signal Label is set at 2 in this case, to indicate asynchronous data.

Figure 4:
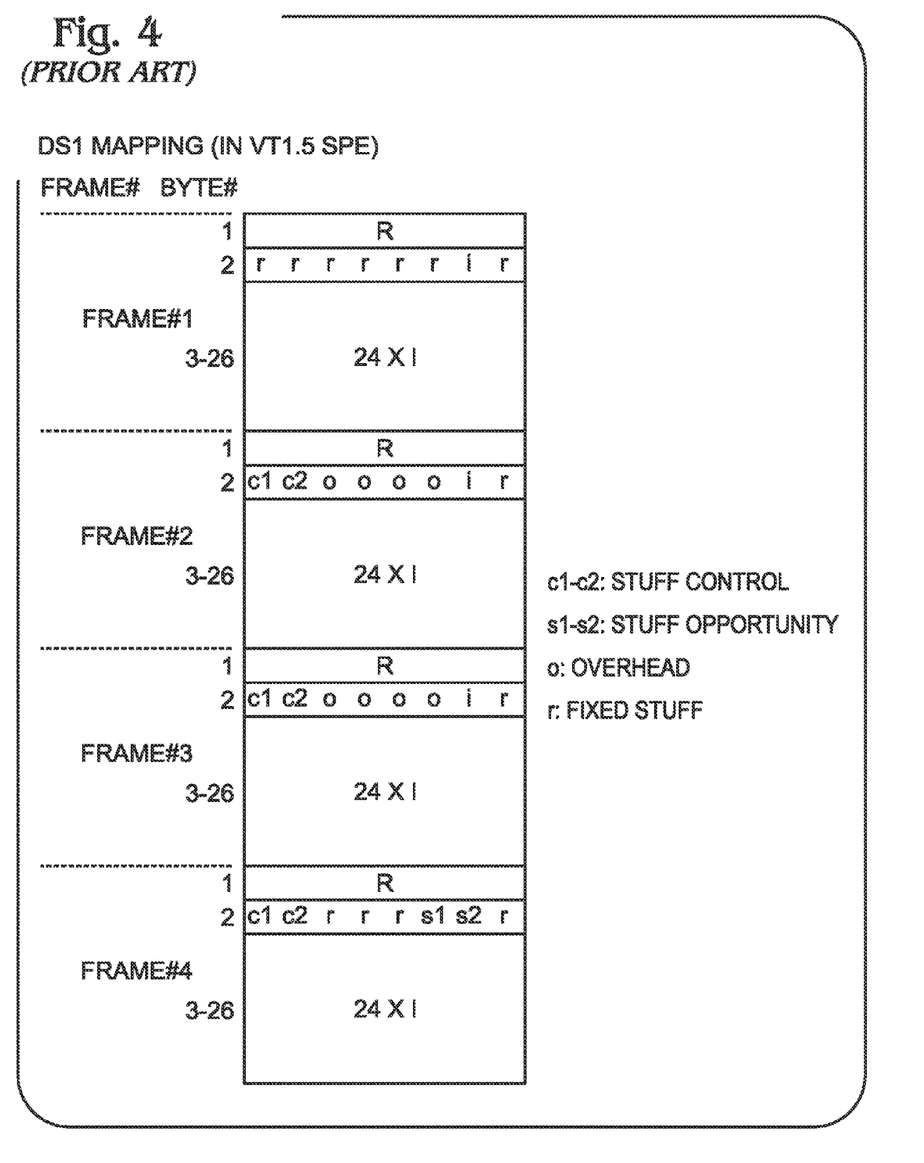
FIG. 4 is a diagram depicting a 1.544 Mb/s DS1 tributary mapped into a SDH TU-11 SPE virtual container (prior art).

FIG. 4 is a diagram depicting a 1.544 Mb/s DSI tributary mapped into a SDH TU-11 SPE virtual container (prior art).

Figure 5:
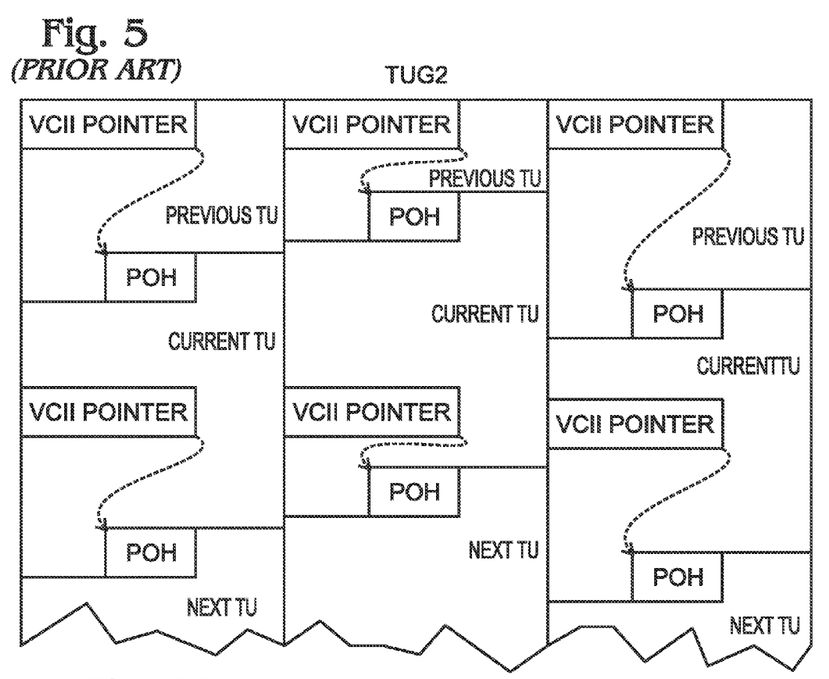
FIG. 5 is a diagram depicting the mapping of TU-11 into a TUG-2 (prior art).

FIG. 5 is a diagram depicting the mapping of TU-11 into a TUG-2 (prior art). A pointer is added to define the phase alignment, by pointing at the POH of each VC. The phase may change during transmission due to a clock domain change between SONET/SDH network elements, introduced by the regeneration and multiplexing equipment, and wander, resulting from temperature differences within the transmission media. Since the various multiplexers may not be synchronous, a pointer is added at a fixed position within the TU. The value of the pointer indicates the start of the VC. The phase of the VC is represented by the pointer, indicating a data rate that is either faster or slower than the TU rate. This difference in speed can be up to one byte per frame in SDH. The TUs are multiplexed into a TUG by interleaving bytes from each TU in turn. Seven TUG 2s can be byte interleaved into a TUG 3, and three TUG 3s can be byte interleaved to form a VC4.

There are other methods for carrying PDH tributaries, although the SONET/SDH is probably the most widely known. These other methods include FTI-2 (Flexible Tributary Interface—level 2), an interface developed by Applied Micro Circuits Corp, which supports both serial and parallel modes of data transfer. Telecom buses are also known that use a parallel bus data format to transport PDH tributaries. SBI (Scalable Bandwidth Interface) is a proprietary interface developed by PMC-Sierra. All these formats support VT bit asynchronous mapping for DS1/E1s tributaries.

It would be advantageous to smoothly transport bit-mapped PDH tributaries (DS1/E1) between Integrated Circuits (ICs) or Telecommunications systems while preserving their payload integrity, timing and synchronization characteristics, and bit sequence order.

SUMMARY OF THE INVENTION

The present invention solves the problem of transporting PDH tributaries (DS1/E1) over a Telecom interface in an efficient, reliable way that preserves the bit integrity and quality of the timing, and synchronization characteristics of the transported tributaries. The Flexible Tributary Interface, as the name implies, solves this problem in a flexible, scalable way using a minimum number of pins and board resources.

Accordingly, a method is provided for transporting Plesiochronous Digital Hierarchy (PDH) tributaries. The method comprises: accepting a plurality of PDH tributaries; generating a serial data stream of interleaved PDH tributaries; generating a serial control stream of signals for recovering the PDH tributaries; and, generating a clock signal for timing the data and control streams.

The serial data stream of interleaved PDH tributaries is loaded into the payload of a data frame structure. Likewise, the serial control stream is loaded into the payload of a control frame structure. The data bytes of the serial data stream and the control bytes of the serial control stream are both transmitted at the same data rate. That is, there is a control byte generated for each data byte. Thus, the control bytes in the control frame structure are aligned with corresponding data bytes in the data frame structure.

In another aspect, the method further comprises: receiving the generated serial data stream; receiving the generated serial control stream; receiving the generated clock signal; disinterleaving the interleaved PDH tributaries in response to the clock signal and serial control stream; and, supplying the plurality of disinterleaved PDH tributaries meeting a first system interface timing requirement.

The PDH tributaries are disinterleaved exclusively in response to the clock signal and serial control stream. That is, the initial information byte in a disinterleaved PDH tributary frame is identified in response to decoding information from a corresponding control byte. The disinterleaving is also aided by: identifying a frame payload location marker (J0 byte location) in the serial data stream; identifying a frame payload location marker (J0 byte location) in the serial control stream; and, aligning the J0 byte in the serial data stream with the J0 byte from the serial control stream.

Additional details of the above-described method and a system for transporting PDH tributaries are presented below.

DETAILED DESCRIPTION

Figure 6:
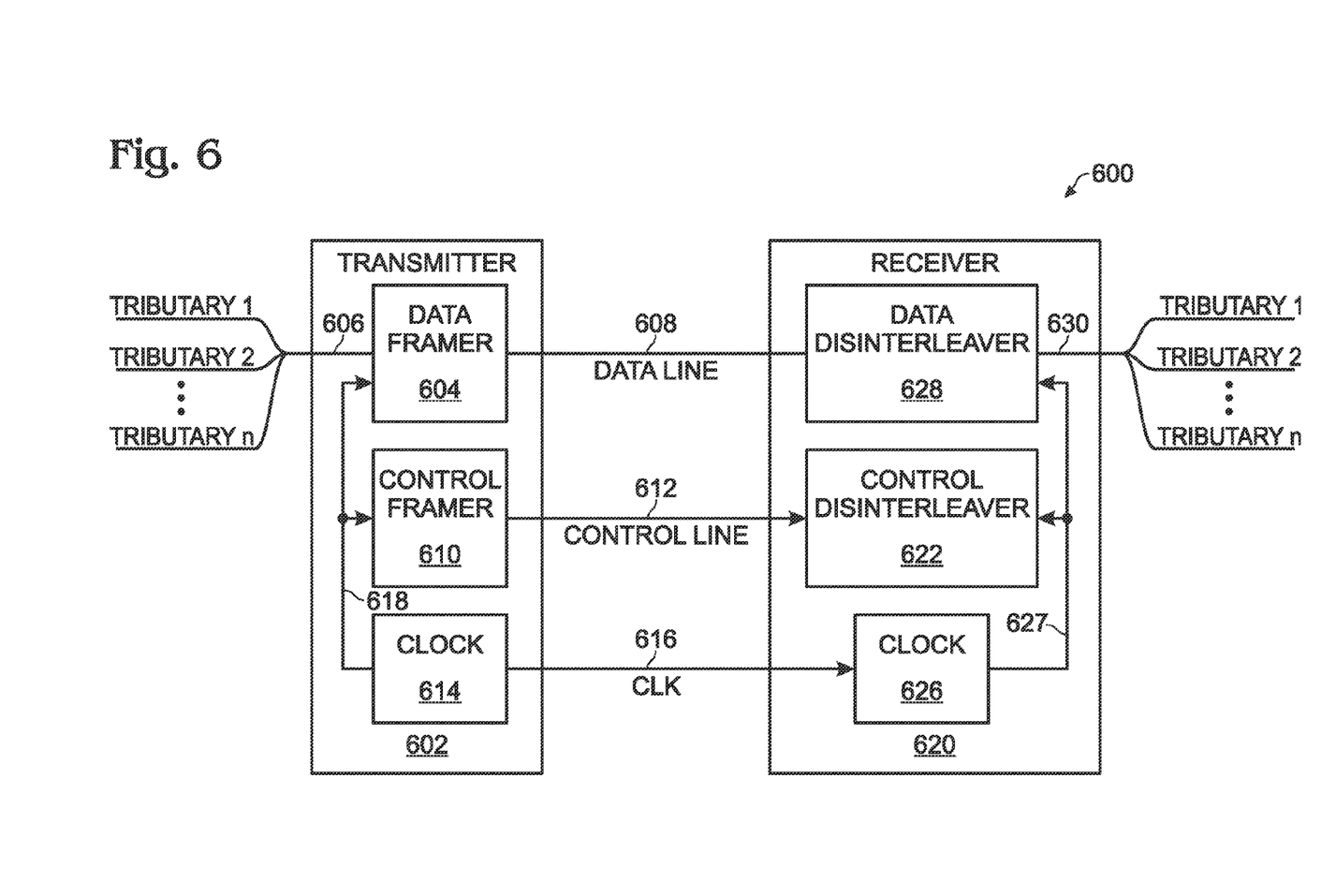
FIG. 6 is a schematic block diagram depicting a system for transporting Plesiochronous Digital Hierarchy (PDH) tributaries.

FIG. 6 is a schematic block diagram depicting a system for transporting Plesiochronous Digital Hierarchy (PDH) tributaries. The system 600 comprises a transmitter 602. The transmitter 602 includes a data framer 604 having an input on line 606 to accept a plurality of PDH tributaries and an output on line 608 to supply a serial data stream of interleaved PDH tributaries. Here, n tributaries are shown, where a is not limited to any particular number. In one aspect, the n tributaries are multiplexed into a single input (pin). Alternately, the n tributaries are multiplexed into m inputs (pins), where m is a value greater than 1 and less than n. In another aspect, the transmitter 602 has an input for every tributary.

A control framer 610 has an output on line 612 to supply an internally generated serial control stream of signals for recovering the PDH tributaries. A clock 614 has an output on line 616 to supply a clock signal for timing the data stream and the control stream. Internally, the clock signal is delivered on line 618, to define and align the data with control information. Because the tributaries are delivered asynchronously, the data framer 604 must add stuff bits to the data stream in the event of a late bit delivery Unlike prior art interfaces that embed pointers in the overhead of the data to differentiate information from stuff bits, transmitter 602 embeds information in a separate control channel that enables a receiver to differentiate between information and stuff bits.

The data framer 604 interleaves the PDH tributaries on line 606 into the payload of a data frame structure transmitted on line 608, as is described in more detail below. Likewise, the control framer 610 loads the control stream into the payload of a control frame structure that is supplied on line 612. The control framer 610 generates a control byte for each data byte transmitted by the data framer 604. The data framer 604 and the control framer 610 transmit data bytes and control bytes, respectively, at the same data rate. Alternately stated, the control framer 610 interleaves control bytes into the payload of the control frame structure, aligned with corresponding data bytes in the data frame structure.

As described in more detail below, the PDH tributaries (and control bytes) may be organized into the payload. of a frame structure, where the frame has 9 rows and 90 columns, and the PDH tributaries are interleaved into columns 5 through 90 of each row. For example, the data framer 604 may accept 28 DS1 tributaries (see FIG. 8). By interleaving the PDH tributaries into columns 5 through 90 of each row, 3 bytes from every DS1 tributary are loaded into each row. If the data framer 604 accepts 21 E1 tributaries, then 4 bytes from every E1 tributary can be loaded into each row.

The system 600 may further comprise a receiver 620. The receiver 620 includes a control disinterleaver 622 having an input on line 612 for receiving the serial control stream and an output on line 624 for supplying disinterleaved control bytes. A clock 626 receives the clock signal on line 616, which is distributed on line 627. A data disinterleaver 628 has an input for receiving the serial data stream on line 608 and an output on line 630 to supply the plurality of disinterleaved PDH tributaries meeting a first system interface timing requirement. The PDH tributaries are disinterleaved in response to the clock signal and signals in the control bytes. The tributaries can be multiplexed and supplied from a single output (pin), or supplied from separate outputs.

In one aspect, the control disinterleaver 622 decodes information from a control byte. This decoded information is sent to the data disinterleaver on line 624. The data disinterleaver 628 is able to identify the initial information byte in a disinterleaved PDH tributary frame, in response to receiving the decoded information from the control disinterleaver 622.

In another aspect, the control disinterleaver 622 identifies a frame payload location marker (J0 byte location) in the serial control stream. The data disinterleaver 628 aligns the serial data stream with the serial control stream by identifying a frame payload location marker (J0 byte location) in the serial data stream. The data disinterleaver 628 aligns the J0 byte in the serial data stream with the J0 byte from the serial control stream. Alternately, the control disinterleaver 622 aligns the J0 byte in the data stream with the J0 byte in the control stream and sends alignment information to the data disinterleaver 628 on line 624.

Although system 600 depicts a unidirectional communication link, in other aspects (not shown) the communication link is bidirectional, in which case there is a transmitter and receiver on each end of the link represented by lines 608, 612, and 616.

Functional Description

The Flexible Tributary Interface (FTI-0) system described above efficiently transports PDH tributaries with a minimum number of pin and board resources. Although numbers associated with DS1 and E1 tributaries have specifically been mentioned, the system is scalable. FTI-0 is a bidirectional interface, with directions running at the same speed, for example at 51.84 MHz. The interface is driven by system clock (SCLK), nominally provided by an external timing source, which may be specified to +/−20 ppm, or better, in some aspects of the system. Each direction operates with its own, transmitter-supplied clock, which is used to synchronously drive the data.

FTI-0 transmit (Tx)-side signals consist of serial data (FTI_TX_SDATA), serial control (FTI_TX_SCTRL), and clock (FTI_TX_CLK). Similar signals exist on the receiver (Rx) side (FTI_RX_SDATA, FTI_RX_SCTRL, FTI_RX_CLK). Every 8 clock pulses there is a new byte on the data line, as well as a new control byte on the control line.

Figure 7:
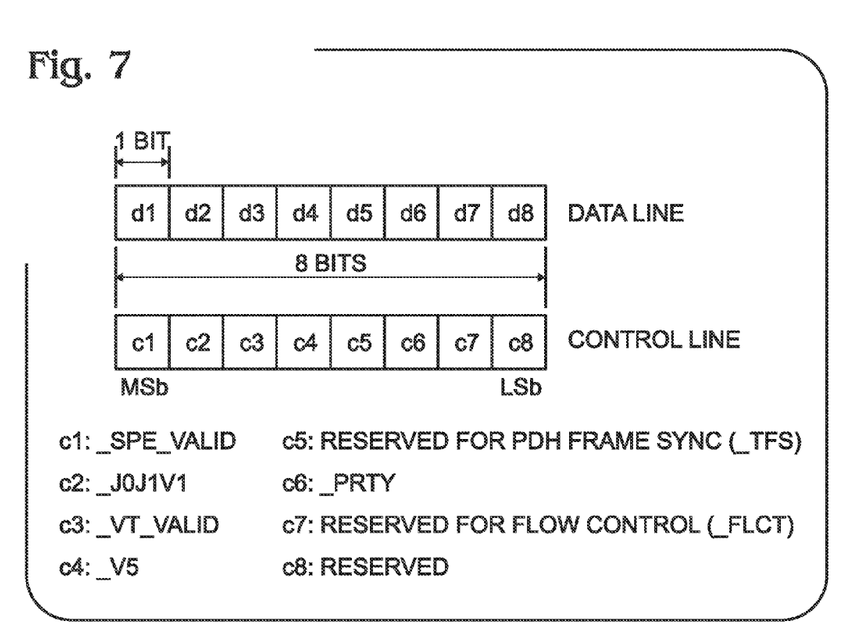
FIG. 7 is a diagram depicting the data and control line formats.

FIG. 7 is a diagram depicting the data and control line formats. The control byte packs control signal values, as shown. J0J1V1 is used for framing, SPE_VALID is used as an SPE marker, VT_VALID is used as a VT-SPE marker, and PRTY is used for byte parity checking purposes. Control signals such as J0J1V1, V5, and VT_VALID, that would otherwise require multiple parallel pins in an IC transmitter or receiver, are being packed into control bytes. The control bytes carry all the control information in only one control line (IC pin) per direction. Some slots (bits) within the control byte may be reserved, to permit future enhancements.

Both data line frames and a control line frames exist, which must be aligned at the receiving end in order to properly extract the PDH tributaries. Once the data and the control frames are aligned, each data byte is extracted using control information from the aligned control byte, since they are both associated with the same tributary.

The position of stuff bits in each data frame is identified through the control information in the control bytes, although their actual value is identified by inspection of the inband data bits. While it is novel to use signals in a separate control stream to extract the stuff information, conventional bit asynchronous mapping may be used once the stuff byte locations are known. Alternately stated, the control signals in the control stream are used to point to the. stuff bit locations in a PDH tributary.

The first step in locating the stuff bits is to find the V5 location in the frame, and this happens when the V5 signal is high for the tributary under inspection. The bit asynchronous mapping (see FIG. 3 for E1, or FIG. 4 for DS1), creates S1 and S2 bits, which are the stuff (opportunity) bits. The stuff (control) bits C1 and C2 are repeated 3 times and they control the stuffing decision. All these bits (S1, S2, C1, and C2) are in a fixed relationship with the initial byte of the VT SPE, which is always the V5 byte. Thus, the S1, S2, C1, and C2 bits are easy to find after the V5 position is known in the frame.

Figure 8:
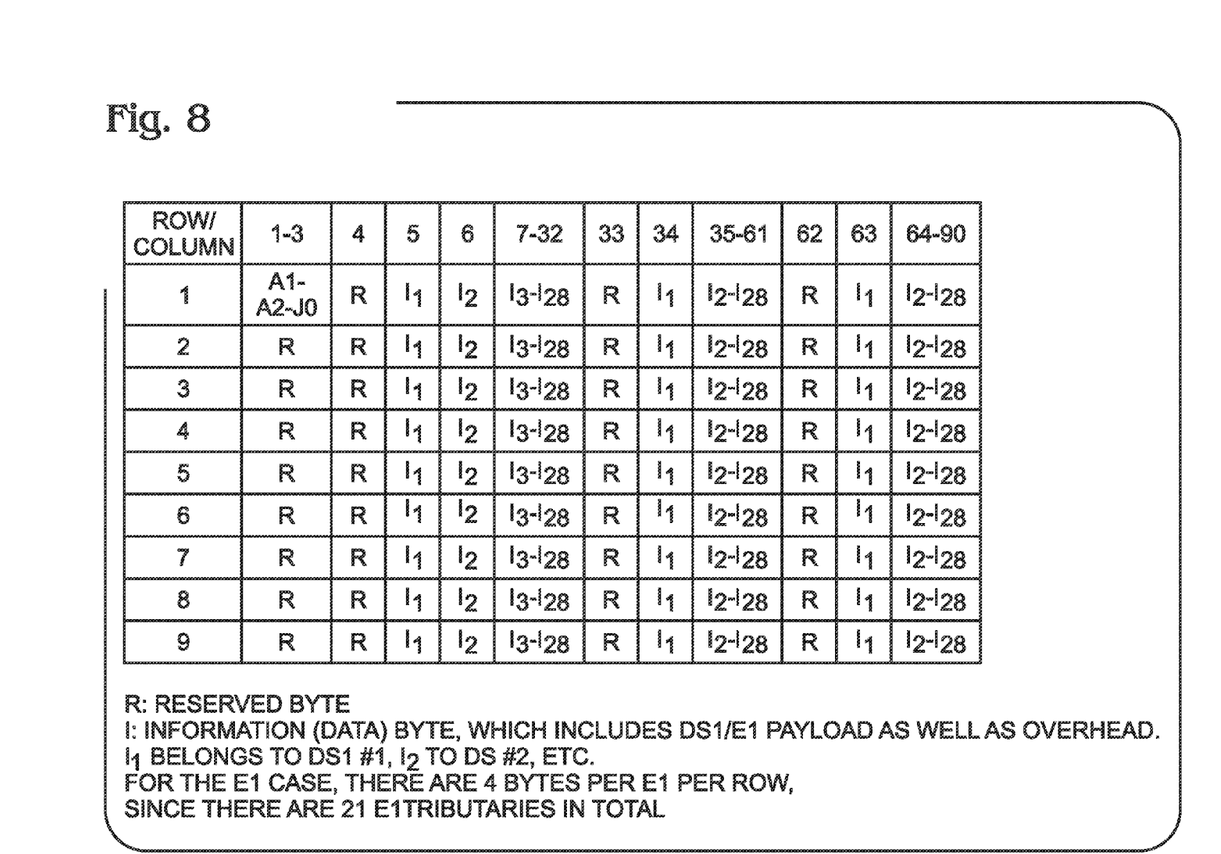
FIG. 8 is a diagram of an exemplary data frame for DS1 mapping.

FIG. 8 is a diagram of an exemplary data frame for DS1 mapping. A SONET/SDH-like frame structure is used to define the boundaries of the data line frame, with a repetition rate of 125 us, which interfaces well with DS1/E1 frame repetition rates. The frame is organized in 9 rows and 90 columns, with transmission from left to right and top to bottom. A F6-28 (hexadecimal) framing pattern occupies the A1-A2 bytes, and is used at the receiver end to identify the start of the data line frame.

The I bytes (information area) contain 28 DS1 or 21 E1 tributaries, which are time division multiplexed. DS1 bit streams are mapped onto FTI-0 via a VT1.5/TU-11-like structure, as shown. E1 bit streams are mapped onto FTI-0 via a VT2/TU-12-like structure. The tributary numbering follows a SONET/SDH-like scheme, with 4 indices (quadrant #, STS-1 #, VT group #, and VT #).

Figure 9:
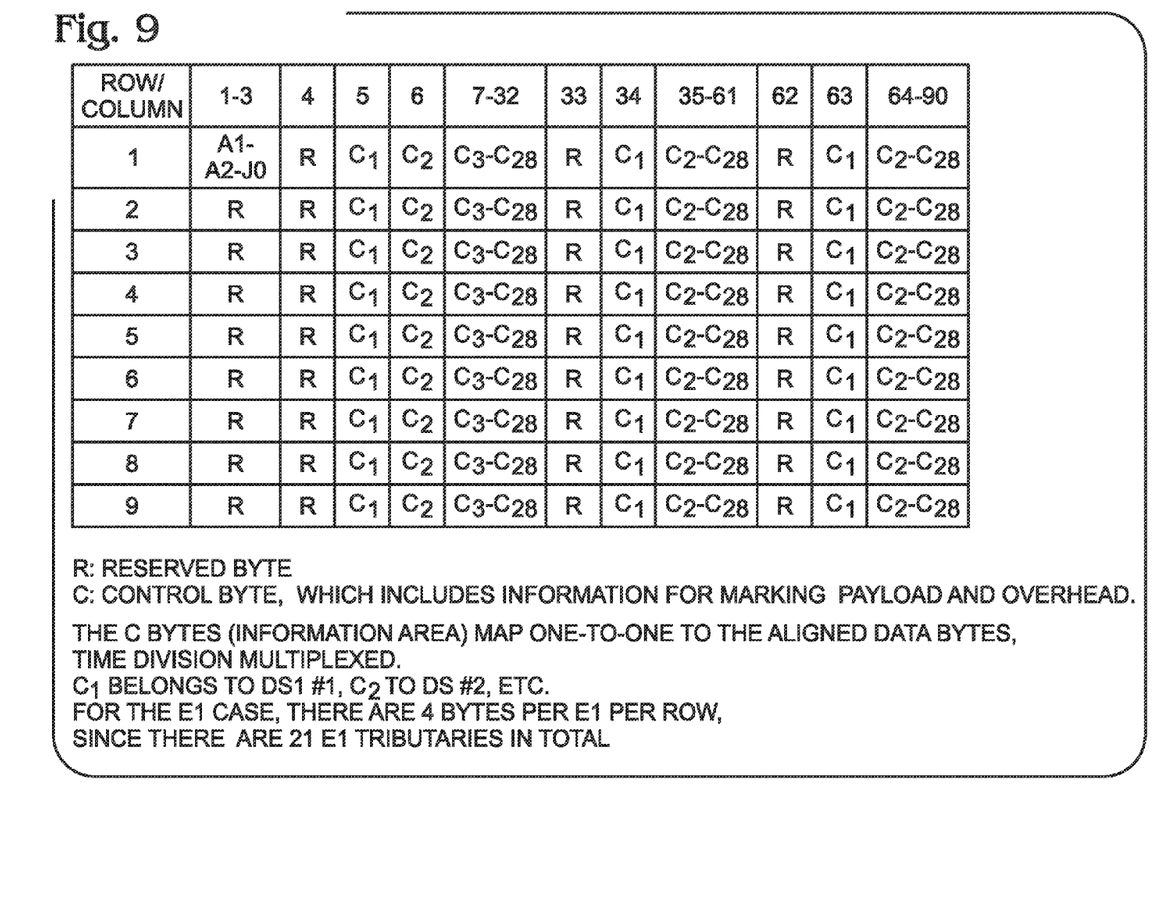
FIG. 9 is a diagram depicting an exemplary control frame for DS1 mapping.

FIG. 9 is a diagram depicting an exemplary control frame for DS1 mapping. The control line is loaded in a SONET/SDH-like frame structure, similar to the one used for the data line (FIG. 8). The structure is used to define the boundaries of the control line frame. The frame structure has. the same repetition rate as the data frame, for example 125 us. The control frame is organized in 9 rows and 90 columns, with transmission from left to right and top to bottom. A F6-28 (hexadecimal) framing pattern occupies the A1-A2 bytes, and is used to identify the start of the control frame.

The FTI-0 bus is a serial interface, and only 3 pins are required per direction (Rx and Tx). The pins are serial data, serial control, and a clock. The resultant IC is easier to package, and the reduced number of pins simplifies board design. Source synchronous clocking permits the reliable transport of signals over the interface and eases board design requirements. Although DS1 and E1 formats, and STS-1 densities have been used as examples, the invention is very easily expandable to an STS-3/STM-1 density, by using a SONET-like multiplexing of timeslots. The invention eliminates the need for pointer processing, as the control signals are adequate for payload marking and demapping.

Figure 10:
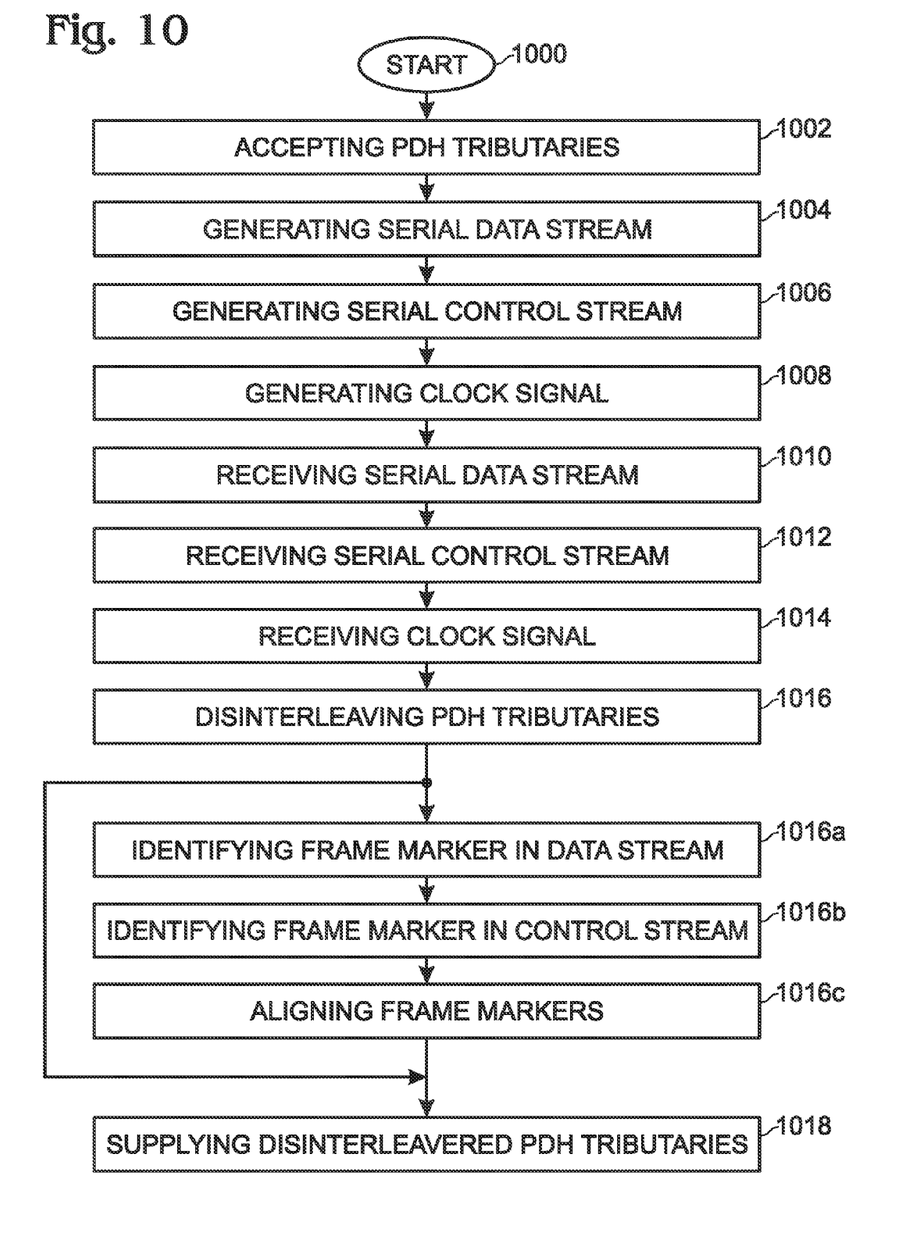
FIG. 10 is a flowchart illustrating a method for transporting PDH tributaries.

FIG. 10 is a flowchart illustrating a method for transporting PDH tributaries. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1000.

Step 1002 accepts a plurality of PDH tributaries. Step 1004 generates a serial data stream of interleaved PDH tributaries. Step 1006 generates a serial control stream of signals for recovering the PDH tributaries. Step 1008 generates a clock signal for timing the data and control streams.

Typically, generating the serial data stream in Step 1004 includes interleaving the PDH tributaries into the payload of a data frame structure. Likewise, generating the serial control stream in Step 1006 includes loading the control stream into the payload of a control frame structure. In one aspect, Step 1004 transmits data bytes at a first data rate, and Step 1006 transmits control bytes at the first data rate. Alternately expressed, Step 1006 generates a control byte for each generated data byte. Then, Step 1006 interleaves control bytes in the control frame structure, aligned with corresponding data bytes in the data frame structure.

Step 1010 receives the generated serial data stream. Step 1012 receives the generated serial control stream. Step 1014 receives the generated clock signal. Step 1016 disinterleaves the interleaved PDH tributaries in response to the clock signal and serial control stream. Step 1018 supplies the plurality of disinterleaved PDH tributaries meeting a first system interface timing requirement. The first system interface timing requirement refers to jitter and wander specifications that must be met for the disinterleaved PDH tributaries to be decoded at a destination. More explicitly, disinterleaving the interleaved PDH tributaries in Step 1016 includes disinterleaving the interleaved PDH tributaries exclusively in response to the clock signal and serial control stream, without the use of a pointer in the data stream, or pointer processing on the receiver side.

In one aspect, disinterleaving the interleaved PDH tributaries in Step 1016 includes substeps. Step 1016a identifies a frame payload location marker (J0 byte location) in the serial data stream. Step 1016b identifies a frame payload location marker (J0 byte location) in the serial control stream. Step 1016c aligns the J0 byte in the serial data stream with the J0 byte from the serial control stream.

In another aspect, disinterleaving the interleaved PDH tributaries in Step 1016 includes checking the parity of a data byte in response to decoding information from a corresponding control byte.

In a different aspect, disinterleaving the interleaved PDH tributaries in Step 1016 includes identifying the initial information byte in a disinterleaved PDH tributary frame, in response to decoding information from a corresponding control byte. Further, Step 1016 disinterleaves the interleaved PDH tributaries by identifying the location of stuff opportunity and stuff control bytes in the serial data stream. These locations are determined as a result of decoding information, such as the V5 bit, from the serial control stream.

Figure 11:
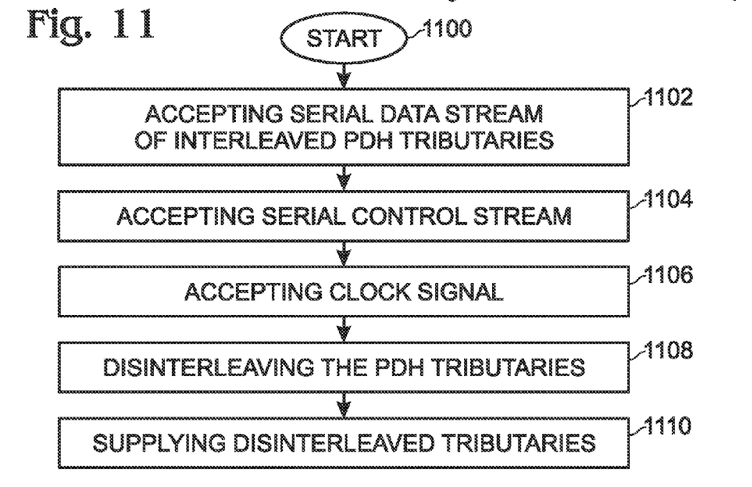
FIG. 11 is a flowchart illustrating a method for receiving transported PDH tributaries.

FIG. 11 is a flowchart illustrating a method for receiving transported PDH tributaries. The method starts at Step 1100. Step 1102 accepts a serial data stream of interleaved PDH tributaries. Step 1104 accepts a serial control stream of signals for recovering the PDH tributaries. Step 1106 accepts a clock signal for timing the data and control streams. Step 1108 disinterleaves the interleaved PDH tributaries in response to the clock signal and serial control stream. Step 1110 supplies the plurality of disinterleaved PDH tributaries.

A system and method have been presented for transporting PDH tributaries. Examples of DS1 and E1 tributaries have been given to illustrate the invention, however, the invention is not limited to merely these examples. Likewise, examples of particular control signals have been used, but the invention is not necessarily so limited. Other variations and embodiments of the invention will occur to those skilled in the art.

I claim:

1. A method for receiving transported Plesiochronous Digital Hierarchy (PDH) tributaries, the method comprising:
    a receiver accepting an electromagnetic waveform representing a serial data stream of PDH tributaries interleaved into a payload of a data frame structure;
    accepting an electromagnetic waveform representing a serial control stream of signals, for recovering the PDH tributaries, loaded into the payload of a control frame structure with a control byte for every data byte;
    accepting an electromagnetic waveform representing a clock signal for timing the data and control streams;
    disinterleaving the interleaved PDH tributaries in response to the clock signal and serial control stream, and,
    supplying an electromagnetic waveform representing the plurality of disinterleaved PDH tributaries.

2. A system for transporting Plesiochronous Digital Hierarchy (PDH) tributaries, the system comprising:
    a receiver including:
        a control disinterleaver having an input for receiving a serial control stream with a control frame structure payload including a control byte for every data byte, and an output for supplying disinterleaved control bytes;
        a clock for receiving a clock signal in a clock serial stream; and,
        a data disinterleaver having an input for receiving a serial data stream of PDH tributaries interleaved into a payload of a data frame and an output supplying a plurality of PDH tributaries disinterleaved in response to the clock signals and the control bytes.

* * * * *